Jan. 26, 1965 N. L. BROYLES 3,167,342
QUICK-ACTION INTERLOCKING SUSPENSION FASTENER
Filed Dec. 12, 1962 2 Sheets-Sheet 1
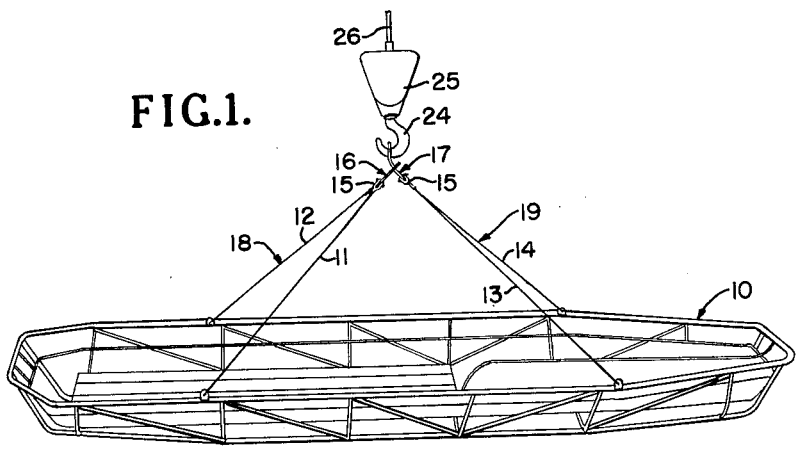
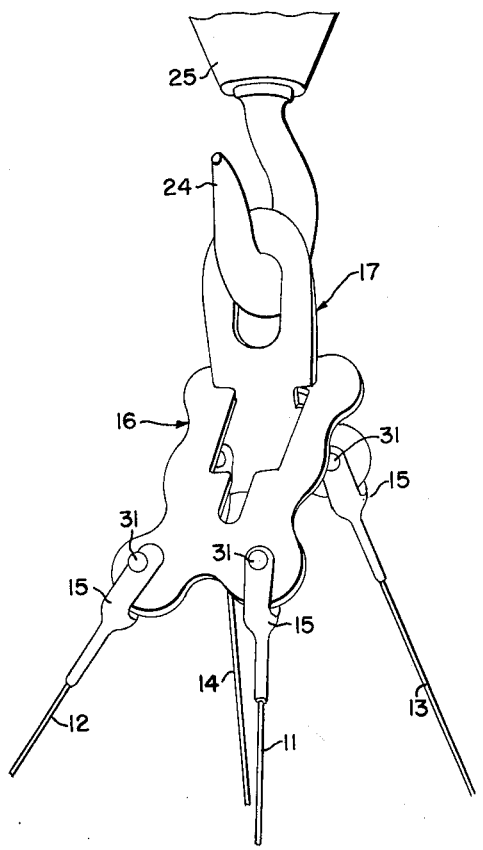
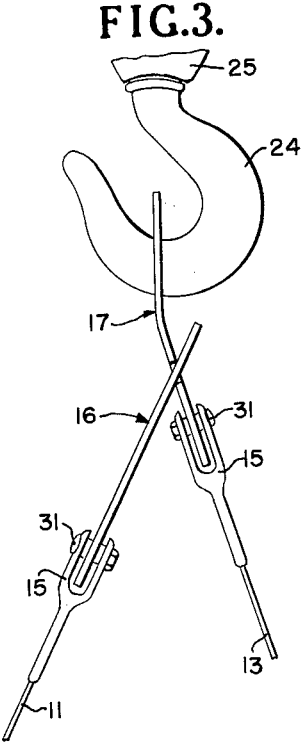
INVENTOR.
NED L. BROYLES
BY
ATTORNEYS.

Jan. 26, 1965   N. L. BROYLES   3,167,342
QUICK-ACTION INTERLOCKING SUSPENSION FASTENER
Filed Dec. 12, 1962   2 Sheets-Sheet 2
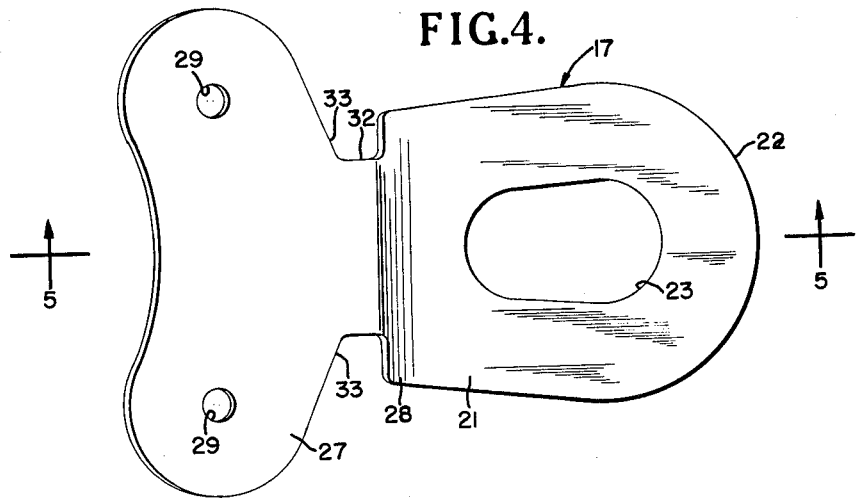
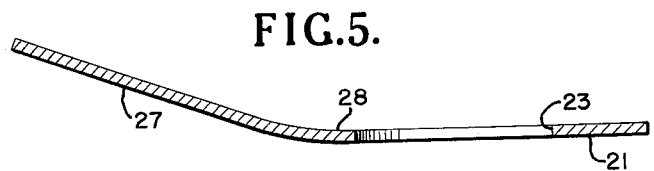
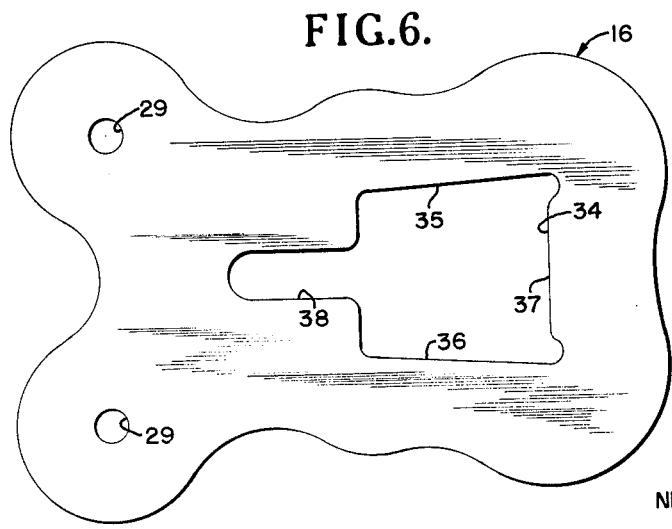
INVENTOR.
NED L. BROYLES
BY
ATTORNEYS.

United States Patent Office 3,167,342
Patented Jan. 26, 1965

3,167,342
QUICK-ACTION INTERLOCKING SUSPENSION
FASTENER
Ned L. Broyles, San Mateo, Calif. (% Staff Commandant, 12th Naval District, Federal Office Bldg., San Francisco 2, Calif.)
Filed Dec. 12, 1962, Ser. No. 244,225
6 Claims. (Cl. 294—67)
(Granted under Title 35, U.S. Code (1952), sec. 266)

The invention described herein may be manufactured and used by or for the Government of the United States of America for governmental purposes without the payment of any royalties thereon or therefor.

This invention relates to interlocking fasteners and more particularly to a quick detachable interlocking fastener for connecting a pair of bridles at the mid-points thereof to a support in such manner that a load attached to the bridles may be suspended therefrom.

The invention is particularly well suited for use with a litter for hoisting an injured person, for example, from the scene of an accident to a place of safety.

In devices of this character heretofore devised it has been the usual practice when connecting a Stokes litter to a helicopter, for example, for helicopter rescue of an injured person, to employ four suspension cables attached to the litter and having the free ends thereof formed in a loop which is slipped over a U-shaped ring with two cables over each leg thereof and to insert a bolt through the legs of the U-shaped ring to connect the two legs and provide a lifting surface. A nut is thereafter fitted to the bolt to prevent slippage of the bolt through the ring member and the U-shaped ring holding the four cables with bolt and nut in place is placed on the hoisting hook. Such a device has not proved altogether satisfactory under all conditions of service by reason of the multiplicity of the separate parts employed in the attachment fitting comprising four separate cable loops, the U-ring, the nut and the bolt. In practice the nut and bolt must first be removed from the U-ring and, after placing the injured person on the litter, the four cables must be placed on the U-ring and secured with the nut and bolt before allowing the helicopter to hoist the injured person. This procedure is rendered difficult and time consuming by reason of the fact that these operations may be accomplished in certain cases solely by the flight surgeon who may be the only person available who has been lowered from the helicopter to attempt a rescue.

The present invention possesses all of the advantages of the prior art devices and none of the foregoing disadvantages. In accordance with the teaching of the present invention this desirable result is achieved by employing a pair of bridles connected to the litter, each of the bridles having a fixture connected to an intermediate point thereon in such manner that the bridles may be placed in such a position that they do not interfere with the stowing of the injured person in the litter and thereafter are quickly brought into interlocking engagement and connected to a suspension hook whereby the injured man may be raised and suspended by the helicopter without employment of a tool for effecting the connection between the litter and the suspension hook, as will more clearly appear as the description proceeds.

One of the objects of the present invention is to provide a new and improved detachable fastener for suspending a load from a support.

Another object is to provide new and improved means for interlocking a pair of bridles connected to a litter and establishing a hoisting connection to the interlocking means.

Still another object is the provision of a new and improved fastener comprising two separable interlocking fixtures each having at least one cable connected thereto for supporting a load when the fixtures are mutually locked.

A still further object is the provision of a new and improved fastener comprising two fixtures each of which supports a load and one of which additionally supports the other fixture when the fixtures are interlocked.

Still other objects, advantages and improvements will be apparent from a consideration of the following description taken in connection with the accompanying drawings of which:

FIG. 1 is a view of a litter supported by a fastener of the present invention in accordance with a preferred form thereof;

FIG. 2 is a greatly enlarged view of the fastener of FIG. 1 and the supporting means therefor;

FIG. 3 is a side view of the fastener of FIG. 2;

FIG. 4 is a greatly enlarged plan view of one of the fittings comprising the fastener of FIGS. 1-3;

FIG. 5 is a view in section taken along the line 5—5 of FIG. 4; and

FIG. 6 is a plan view of the complementary fastener for use with the device of FIG. 4.

Referring now to the drawings on which like numerals of reference are employed to designate like parts throughout the several views and more particularly to FIG. 1 thereof, there is shown thereon a litter indicated generally by the numeral 10 which may be of any type suitable for the purpose such, for example, as a Stokes litter, to which is secured in a suitable manner four dispensing cables 11, 12, 13 and 14. The cables 11 and 12 are each connected by a clevis 15 to a fixture 16 and in like manner cables 13 and 14 are connected to fixture 17. The cables 11, 12 and fixture 16 comprise a bridle indicated generally by the numeral 18 and in like manner the cables 13, 14 and fixture 17 comprise bridle indicated generally by the numeral 19.

Each of the fixtures 16 and 17 is composed of sheet metal, preferably stainless steel, having a thickness of approximately ⅛ inch and configured generally in the form best shown on FIGS. 4, 5 and 6 of the drawings. Fixture 17, FIG. 4, comprises a flat portion 21 preferably having a rounded end 22 and an elongated aperture 23 therein for engagement with a hook 24, FIG. 1, which may be swiveled, if desired, within a block 25 having a line 26 connected thereto by means of which the hook may be raised or lowered at will. The fixture 17 also comprises a second flat portion 27 bent transversely as at 28 at an angle with respect to the flat portion 21, the degree of bending between portions 27 and 21 of the fixture 17 being controlled by the angle between the bridles 18 and 19 when the litter is suspended therefrom. The flat portion 27 of fixture 17 is provided with a pair of holes 29 for receiving the clevis pins 31 thereby to establish a connection between fixture 17 and cables 13 and 14 when the pins are assembled therein. The fixture 17 is also provided with a transversely reduced portion 32 forming a pair of shoulders 33 for engagement by fixture 16, FIG. 2, for suspension of fixture 16 thereby.

The complementary fixture 16, FIG. 6, is preferably configured substantially as illustrated and provided with a pair of holes 29 for engagement with the clevis pins of cables 11 and 12 to establish a connection therebetween. The fixture 16 is preferably flat throughout and provided with an aperture 34 therein having a pair of surfaces 35 and 36 preferably flat in configuration and tapering slightly outwardly from each other at the portion furthest removed from the holes 29. The degree of separation of these two surfaces is such that the reduced portion 32 of fixture 17 when arranged transversely therebetween is moveable between the surfaces when the shoulders 33 of fixture 17 are in engagement with fixture 16 and fixture 17 additionally engages a transverse surface 37 of fixture 16 extending between surfaces 35 and 36. Surfaces 35 and 36, however, are spaced sufficiently close to reduce movement between fixtures 16 and 17 to a minimum when the fixtures are in the assembled position.

The fixture 16 is also provided with a keyway 38 on the opposite side of aperture 34 from tranverse surface 37 and of sufficient depth to allow the flat portion 21 of fixture 17 to be easily inserted therein and thereafter given a rotative movement of 90° with respect thereto whereby the parts are locked together substantially as shown on FIG. 1-3 of the drawings and fixture 16 is suspended by fixture 17 at a predetermined angle with respect thereto.

When fixture 16 is thus connected to fixture 17 the fastener is in the assembled position and bridles 18 and 19 are connected together without employing a tool for this purpose. The assembled fastener is now connected to hook 24 by placing the hook through aperture 23 of fixture 17 whereby the litter may be raised by tension applied to the line 26 by a helicopter.

Whereas the invention has been described with particular reference to a litter connectable to a helicopter for raising an injured person from the scene of an accident to a safe location by a pair of bridles, it is not so limited as it may be advantageously employed in the suspension of a load other than a litter and furthermore the bridle connections may be replaced by a pair of lines or a greater number of cables or chains interconnecting the separable fixture elements of the connector to the load, if desired, within the purview of the present invention. Furthermore the interlocking fixtures may be of different configuration than the preferred form illustrated and described provided the general principle of operation thereof is maintained.

Whereas the invention has been described with particular reference to a preferred example thereof which gives satisfactory results, it is not so limited as it will be apparent to one skilled in the art, after understanding the invention, that various changes and modifications may be made without departing from the spirit and scope of the invention and it is intended, therefore, in the appended claims, to cover all such changes and modifications.

What is claimed as new and desired to be secured by Letters Patent of the United States is:

1. A fastener comprising
a pair of interlocking quick detachable fixtures,
a first one of said fixtures having a flat portion with an eye formed therein for connection to a support,
means connecting a bridle cable to said first fixture,
said cable connecting means having a pair of oppositely disposed shoulders formed thereon,
a second fixture having a keyway therein for receiving said flat portion of said first fixture,
means on said second fixture engageable by said shoulders when said flat portion has been inserted into said keyway and rotated 90° with respect thereto locking the second fixture to the first fixture for suspension thereby,
and means on said second fixture connecting a second bridle cable thereto in a manner to support a load suspended from said bridle cables when the first fixture is connected to the support.

2. A fastener according to claim 1 in which the fixtures are each composed of sheet metal.

3. A fastener according to claim 2 in which said first fixture includes
a transverse bent portion intermediate the eye portion and bridle cable supporting portion whereby the flat portion is substantially vertical when the first fixture is suspended from the support
and the bridle cables support a load.

4. A device for quickly connecting a litter to a hoist hook, the litter having a pair of bridle cables connected thereto from which the cable is suspended when the litter is hoisted, the improvement comprising
a first fixture connected to one of said bridle cables and having an eye formed therein for connection to the hook and a pair of oppositely disposed shoulders thereon intermediate said eye portion and the bridle connection to the fixture,
and a second fixture having a keyway therein to receive the eye portion of the first fixture and configured to lock the second fixture to the first fixture in engagement with said shoulders when the second fixture has been rotated 90° with respect to the first fixture,
said second fixture having a second bridle cable connected thereto in such manner that the bridle cables support a load when the first fixture is suspended from the hook.

5. A fastener comprising
a pair of interlocking quick detachable fixtures,
the first of said fixtures having a flat portion with an eye therein for connection to a hoist hook,
a pair of cables connected to said first fixture at the portion thereof opposite said eye,
a pair of shoulders on said first fixture intermediate said flat portion and the point of connection of said cables,
the second of said fixtures having a keyway for receiving the flat portion of said first fixture,
means on the second fixture for engaging said shoulders when the flat portion has been inserted into said keyway and rotated through an angle of 90° thereby to lock the fixtures together,
a second pair of cables,
and means on said second fixture for connecting the second pair of cables thereto in a manner to support a load suspended from said pairs of cables when the fixtures are interlocked and the first named fixture is hoisted by the hook.

6. A fastener according to claim 5 in which both fixtures are of uniform thickness throughout the length and breadth thereof and composed of stainless steel,
the first of said fixtures being bent at a small angle transversely at a central portion thereof
and the second fixture being flat throughout the length and breadth thereof.

References Cited by the Examiner

UNITED STATES PATENTS

| | | | |
|---|---|---|---|
| 924,710 | 6/09 | Wheildon | 24—221 |
| 2,552,758 | 5/51 | Andersen | 294—82 X |

SAMUEL F. COLEMAN, *Primary Examiner.*

ERNEST A. FALLER, Jr., *Examiner.*